Dec. 28, 1948.   G. MUFFLY   2,457,393
APPARATUS FOR CAUSATION AND PREVENTION OF COLLISIONS
Filed Jan. 14, 1942   5 Sheets-Sheet 1
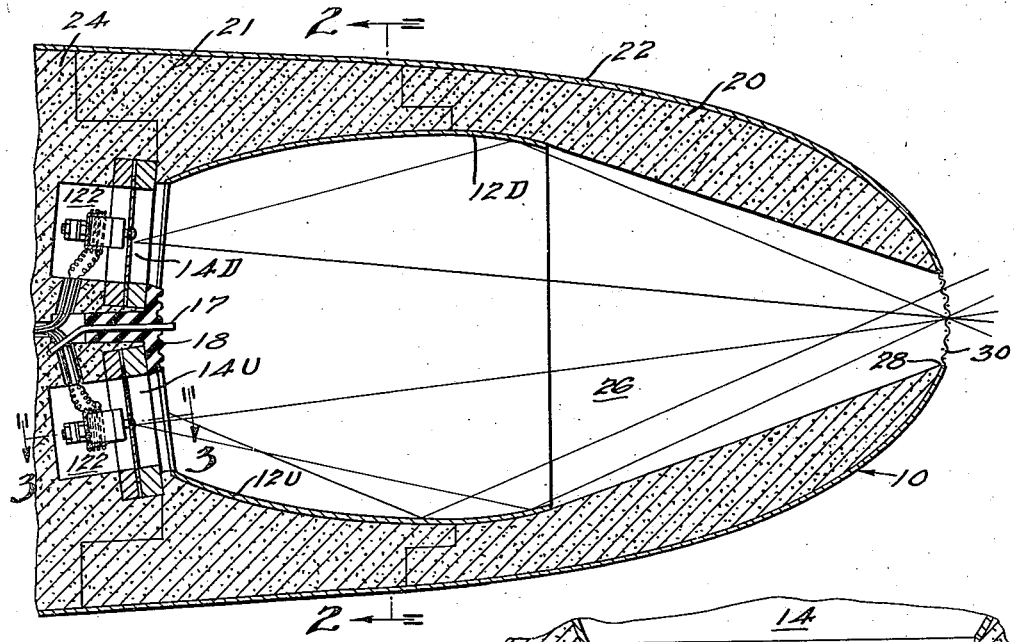
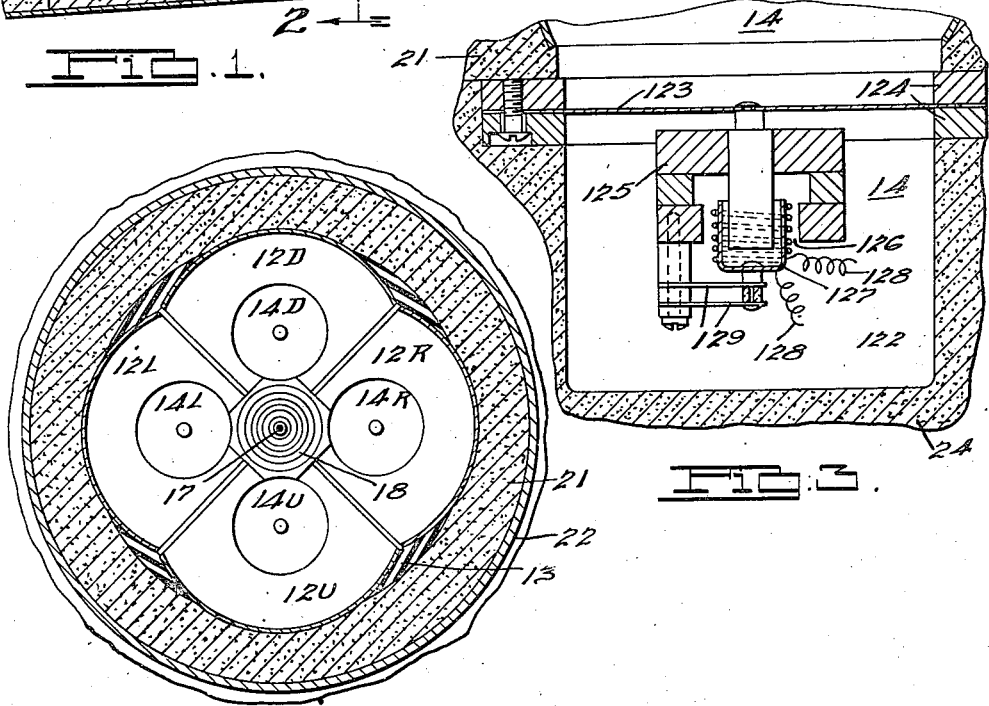
INVENTOR
Glenn Muffly.
BY
Harness, Dickey & Pierce.
ATTORNEYS.

Dec. 28, 1948.    G. MUFFLY    2,457,393
APPARATUS FOR CAUSATION AND PREVENTION OF COLLISIONS
Filed Jan. 14, 1942    5 Sheets-Sheet 2
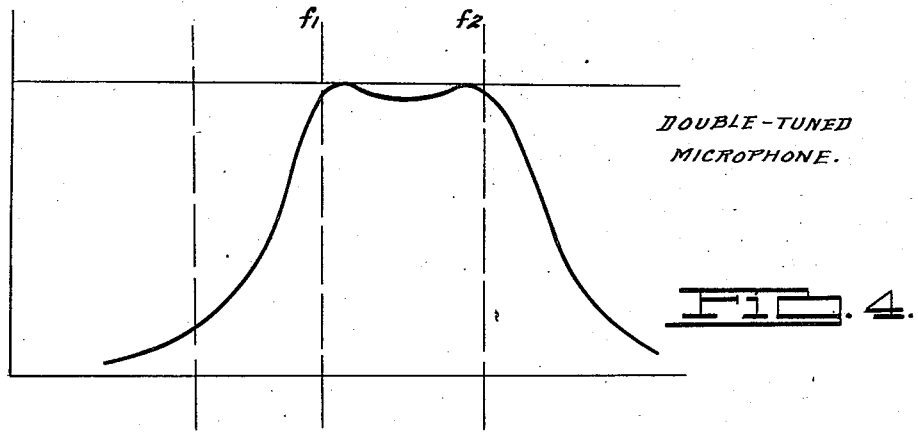
Fig. 4. DOUBLE-TUNED MICROPHONE.
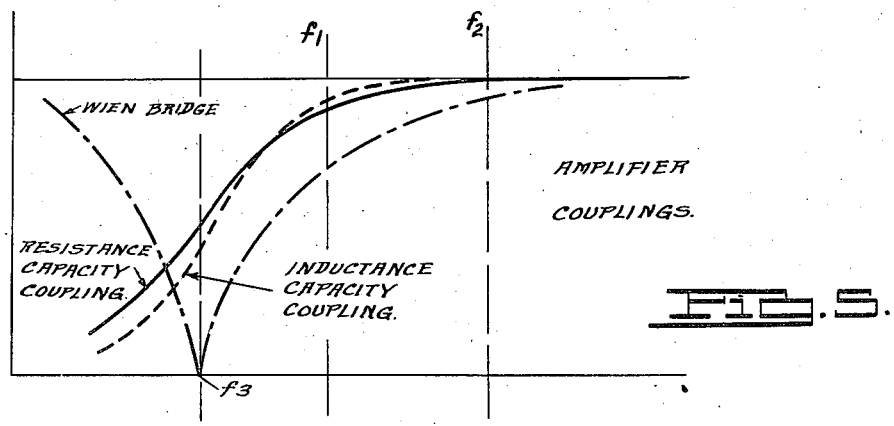
Fig. 5. AMPLIFIER COUPLINGS.
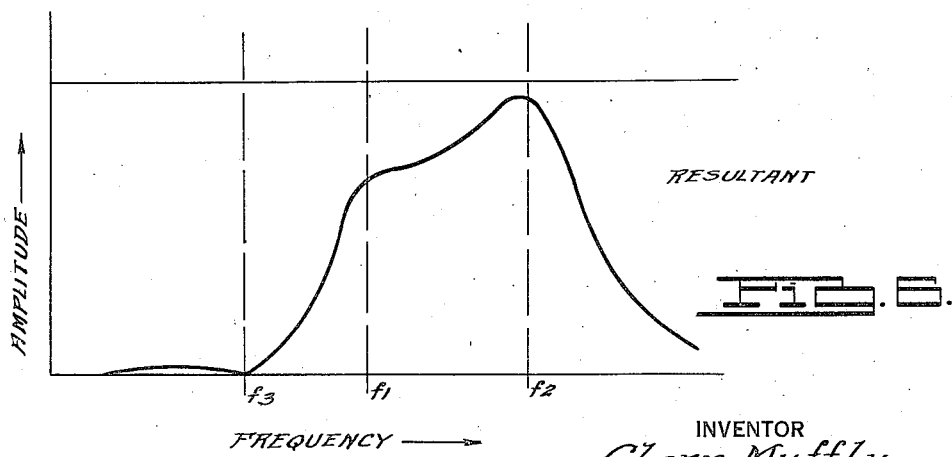
Fig. 6. RESULTANT
INVENTOR
Glenn Muffly.
BY Harness, Dickey & Pierce
ATTORNEYS.

Dec. 28, 1948.   G. MUFFLY   2,457,393
APPARATUS FOR CAUSATION AND PREVENTION OF COLLISIONS
Filed Jan. 14, 1942   5 Sheets-Sheet 3

INVENTOR
Glenn Muffly.
BY
Harness, Dickey & Pierce.
ATTORNEYS.

Dec. 28, 1948.  G. MUFFLY  2,457,393
APPARATUS FOR CAUSATION AND PREVENTION OF COLLISIONS
Filed Jan. 14, 1942  5 Sheets-Sheet 4
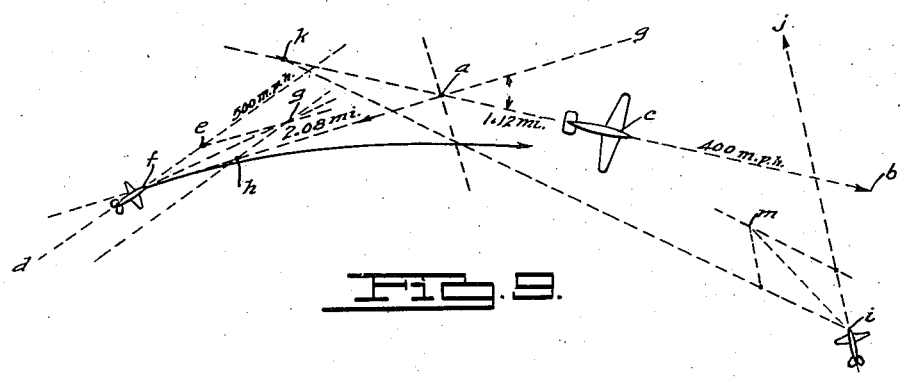
FIG. 9.
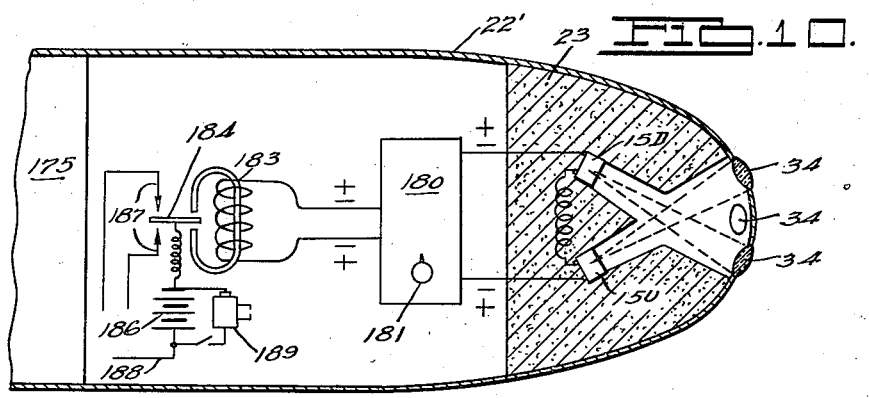
FIG. 10.
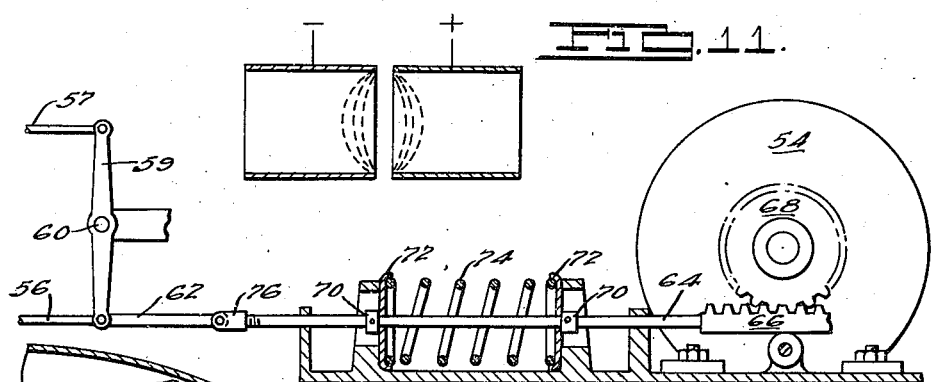
FIG. 11.
FIG. 12.
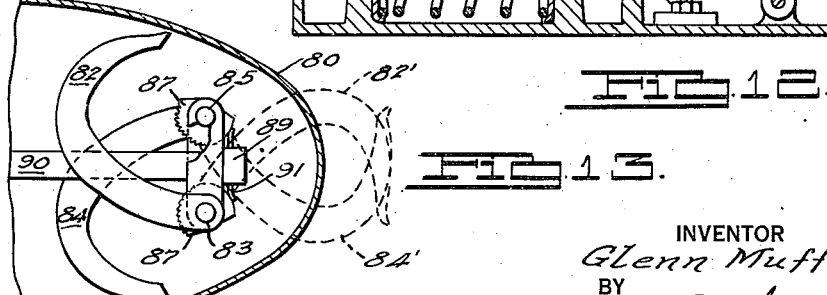
FIG. 13.
INVENTOR
Glenn Muffly.
BY
Harness, Dickey & Pierce.
ATTORNEYS.

Dec. 28, 1948.   G. MUFFLY   2,457,393
APPARATUS FOR CAUSATION AND PREVENTION OF COLLISIONS
Filed Jan. 14, 1942   5 Sheets—Sheet 5
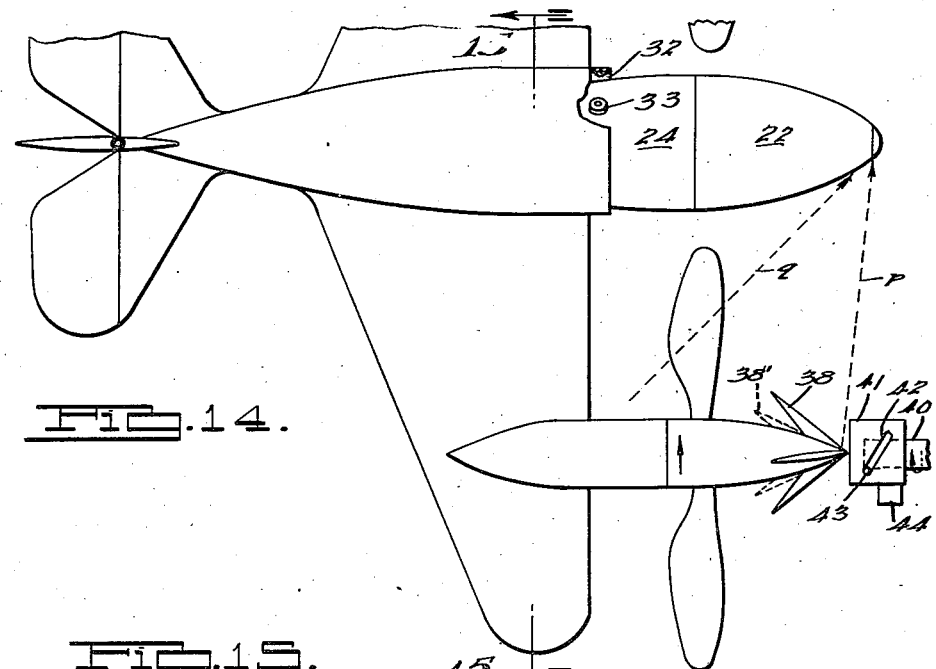
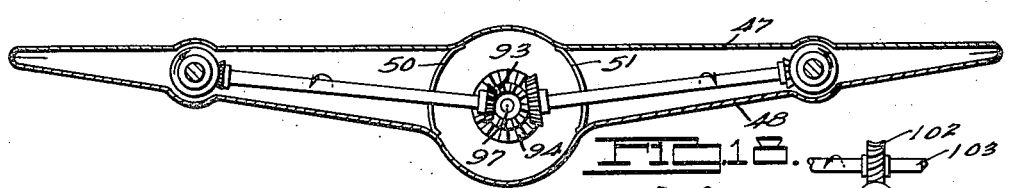
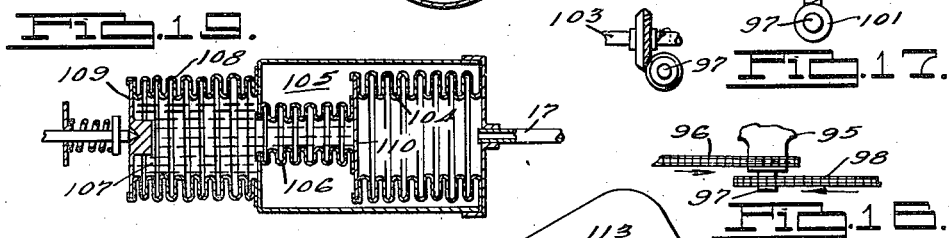
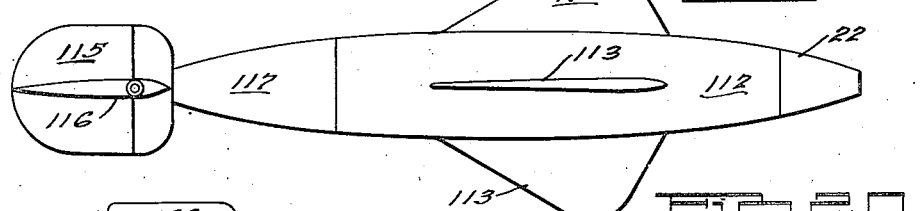
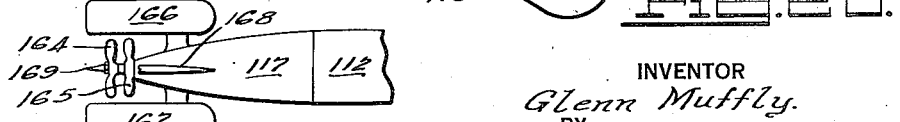
INVENTOR
Glenn Muffly.
BY
Harness, Dickey & Pierce
ATTORNEYS.

Patented Dec. 28, 1948

2,457,393

UNITED STATES PATENT OFFICE 2,457,393

APPARATUS FOR CAUSATION AND PREVENTION OF COLLISIONS

Glenn Muffly, Springfield, Ohio

Application January 14, 1942, Serial No. 426,758

3 Claims. (Cl. 244—77)

This invention pertains to detection and control apparatus for use on aircraft or self-steering missiles. While described as a device for the destruction of enemy aircraft by collision, it will also be useful against land or marine objectives and will operate to guide aircraft so as to prevent collisions when used as an indicating instrument or when the wires leading to the motors which operate the aircraft control surfaces are transposed to reverse the operation of such motors. This application is directed toward an improved construction and arrangement of apparatus over that shown and claimed in my copending application, Serial No. 753,974 filed June 11, 1947, for Aircraft control, as a division of my prior but now abandoned copending application, Serial No. 373,050 filed January 3, 1941. Claims generic to the disclosure of this application and said co-pending application, Serial No. 753,974 are presented in said application, Serial No. 753,974.

An object of this invention is to provide shielding, insulating and canceling means for protection against background sound, heat or whatever type of radiant emanation is employed for the purpose of detection.

Another object is to provide reflecting or lens means for the concentration of such emanations as are to be employed for control purposes.

An additional object is to provide selective reception means particularly responsive to desired frequencies and less responsive or non-responsive to undesired frequencies.

A further object is to amplify the desired frequencies while tuning out undesired frequencies for the purpose of rejecting or minimizing them.

Still another object is to provide control normalizing means for moving a control surface to its neutral position for continuation of straight flight when the plane has turned in the direction of the signal source.

An additional object is to provide a two-way automatic volume control bias for maintaining the ratio of two received signals by preventing the overloading of either of the pair of amplifiers that are interconnected for the balancing of such signals.

A still further object is to provide switch means, including an inertia effect for the opening of a switch in response to a movement which has been initiated by the closing of the switch.

Still another object is to provide means for obtaining power from air flow to actuate controls.

Another object is to provide piercing and grappling means responsive to inertia effects for aiding in the destruction of enemy craft.

Still another object is to provide signal balancing or canceling means acting to reduce the received signal strength as the signal source is approached.

A further object is to provide engine control means for the purpose of throttling the engine while the chaser plane is operating in a circular cruising manner.

An additional object is to provide a mounting for the detection apparatus in such a position relative to the engine and propellers as to minimize interference with detection.

Another object is to provide air flow means for shielding the detection apparatus against the approach of background sounds.

Another object is to provide means for simultaneous actuation of the elevator and the rudder.

A further object is to provide means for actuating control surfaces at a reduced speed when both the elevator and the rudder are moved at one time.

Still another object is to provide for the application of the resultant torque in a direction to reduce the stresses on wing members instead of adding to such stresses.

It is to be understood that the control methods disclosed by this application are in general applicable to the use of sound, heat, light, radio and other radiant emanations produced by or on aircraft. Since sound and heat may be insulated by the same kind of material, as for instance sponge rubber, kapok, mineral wool, etc., it is possible to change from the use of sound to the use of heat by the substitution of thermocouples or heat-responsive cells for the microphones and by making slight changes in the amplifying system. Directional aerials and other changes in the amplifying system will allow use of radio waves, etc.

In shielding against emanations of any type a material suitable for insulating will be used, or the apparatus may be shielded against heat, sound and electronic emanations by the use of laminations of lead, kapok, etc.

Reflecting surfaces suitable for localizing heat rays will act in the same manner upon light and sound waves. Heat or light may also be concentrated by means of a glass lens. Some types of waves may be similarly concentrated by the device known as an electronic lens.

Throughout this specification these several terms are used more or less interchangeably with the major emphasis on sound, but it is to be understood that the invention comprehends the use of any of these forms of energy and any of the insulating, deflecting, pick-up, concentrating, detecting and amplifying devices adapted for the particular form of energy it is desired to employ. The term "chaser," as used herein generally refers to a robot airplane, rocket or bomb for use against an enemy, but it is to be understood that the descriptions apply in reverse to aircraft using my invention for safety.

In the several drawings, similar reference numbers are used to indicate similar parts. In these drawings:

Fig. 1 shows in vertical section, an assembly including insulating, reflecting, and pick-up means, with lines to indicate paths of sound travel.

Fig. 2 is a section of Fig. 1, taken on the line 2—2 thereof.

Fig. 3 is a detailed sectional view of one of the microphones seen in Fig. 1, taken on the line 3—3 thereof.

Figure 7:
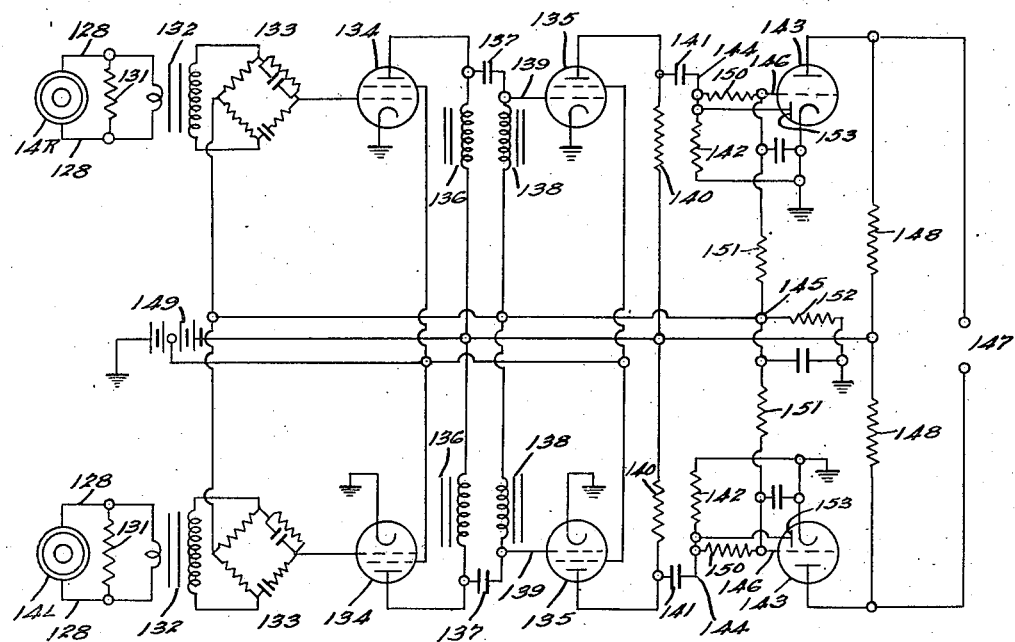

Figs. 4, 5, and 6 are graphs illustrating the sound wave selection and rejection features of the microphones such as shown in Fig. 3 when connected with the amplifiers of Fig. 7.

Figure 8:
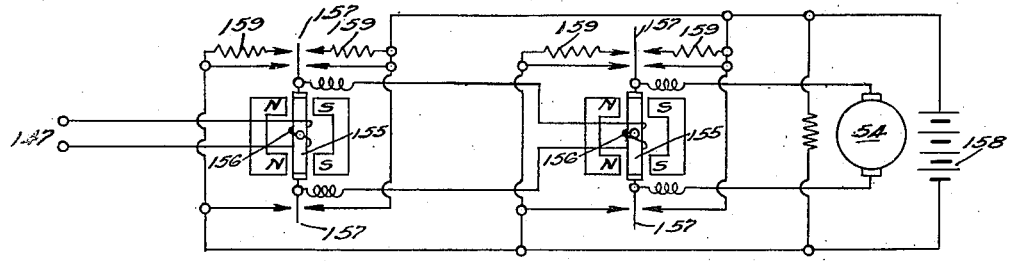

Fig. 7 is a wiring diagram of one of the two pairs of amplifiers, showing how the two amplifiers of the pair are connected with their respective microphones and balanced against each other to provide current for operation of the switches seen in Fig. 8.

Fig. 8 is a wiring diagram of one set of the relay switches which are actuated by the amplifiers seen in Fig. 7 for the purpose of controlling the application of power to the control surfaces of the airplane.

Fig. 9 is a diagram used to illustrate the effects of variations in speeds and paths on the response of the chaser controls.

Fig. 10 shows a modification of Fig. 1 in which lenses are substituted for the reflectors so as to concentrate heat or light rays which may be used instead of sound.

Fig. 11 illustrates an electronic lens such as might replace the type of lens shown in Fig. 10 when certain classes of emanations are used for the purpose of detection.

Fig. 12 is a partly diagrammatic illustration of the driving connection between one of the motors 54 and the control surface which it actuates.

Fig. 13 is a sectional view of a leading edge or nose and a grappling device enclosed therein.

Fig. 14 is a fractional top view of the chaser plane, showing propeller locations, another type of grappling device and a starting device.

Fig. 15 is a vertical sectional view of Fig. 14 on the line 15—15 thereof, illustrating the wing and fuselage construction and one method of driving the two propellers so that their torque reactions counteract lift stresses on the wings.

Fig. 16 is a fractional detail of Fig. 15 illustrating the use of chain drive instead of gear drive to the propellers.

Fig. 17 is a spiral or worm gear drive suitable for use in Fig. 15 when using an engine which provides single rotation only.

Fig. 18 is a modification of Fig. 17 showing the use of skew bevel gears.

Fig. 19 shows a compound bellows device representing one method of utilizing air pressure within the receiving chamber 26 for actuating controls.

Fig. 20 is a gravity bomb equipped with chaser control devices similar to those previously shown, preferably of the heat-responsive type.

Fig. 21 shows a modification of the rudder construction of Fig. 20 to allow the use of an air-driven mechanism to move the control surfaces.

The pick-up device seen in Fig. 1 includes four reflectors 12 and an equal number of microphones or other devices 14 which are responsive to received radiant emanations. Elements 12 and 14 are also identified by letters: U for up, D for down, R for right and L for left.

The housing 10, is partly formed by the insulating nose 20, which is preferably semi-rigid, opaque and non-conductive to heat and sound. If formed of sponge rubber it preferably has a soft, rough interior, while the outer wall is vulcanized to form a hard skin to serve as the outer surface. The nose may be protected by a metal shell 22, but preferably this shell does not extend back to the wing or fuselage upon which this detection apparatus is mounted. The nose 20 and body 21 are supported by the base 24, which is also formed of sound absorbing material having enough rigidity to hold the detection devices and reflectors in their proper relationships, but not including metallic elements which would transmit sound, heat, etc., from the airplane on which the device is mounted into chamber 26, which is formed by the elements 20, 21 and 24. The opening 28 in the nose of the housing 10 may be protected by the screen or grill 30.

The external shape of the housing 10 and of its cover 22, if one is used, are of a form designed to offer the minimum of air resistance. In addition to this the contour is preferably so designed that air noises produced thereon are outside of the opening 28 and not directly in line with it.

The space 26 is open to atmosphere through the screen 30 and is otherwise closed so that there will be an increased air pressure within the space 26, while the plane is in flight. This pressure will vary with the barometer reading and with the air speed of the plane, but will remain substantially constant so far as any momentary fluctuations are concerned. There will therefore be substantially no ingress nor egress of air through the opening 28 except for the balancing of air pressure within the chamber 26 as the plane ascends to lower or descends to higher pressure levels. The form of the screen 30 is selected to divide the zone of substantially still air within the chamber 26 from the zone of turbulent air at the nose of the housing 10. With this dividing shape approximately determined, the placing of the screen will establish the desired division so that there is substantially no flow of air through the screen. The screen may be omitted entirely, or it may be used to prevent the ingress of insects and other foreign matter while flying at low altitudes. There are substantially no insects nor large floating particles of matter at the ordinary altitudes of use.

In Fig. 2 we see the pattern of arrangement of the four reflectors including 12R which reflects emanations coming from the right, 12L which reflects signals from the left, 12U which reflects emanations from above the path of flight and 12D which reflects emanations from below the path of flight. The microphones 14R, 14L, 14U and 14D receive reflections of their similarly lettered reflectors. The opening 28 is preferably located forward of the propellers or what ever may be the most forwardly located sound producing device on the plane.

It will be understood that sound waves reflected from the shell 22 and traveling forward into space ahead of the opening 28 will have traveled well ahead of this opening by the time the opening reaches a given point in space. This sound cannot return and enter the opening 28 unless it is reflected by some object ahead of the chaser plane. If it is reflected by such an object the effect will be the same as if that object had produced the sound, except that the reflected sound is received at a still higher frequency, due to the double Doppler effect. The resultant of the chaser's speed in air as compared with the speed of sound in air is that all sounds from the chaser's engine or propeller will approach the opening 28 more nearly from the rear than they would if the chaser plane were standing still. This fact in combination with the sound insulating effect of walls 20, 21 and 24 and the air velocity over the housing 10 will prevent sounds originating on the chaser plane from entering the opening 28 and impinging upon the reflectors 12 or the microphones 14.

Since there is no air flow into the space 26 and the lines of travel of sound from the chaser's engine and propellers are at such wide angles from any that will enter this opening, it is evident that no sound can enter the opening 28 from a propeller or an engine on the plane which carries this apparatus, unless the sound is reflected by some object forward of the opening 28. If there is such an object, it will be detected by the fact that sound is so reflected.

Primarily the opening 28 is for the purpose of allowing sounds that originate ahead of the plane which carries this apparatus to impinge upon one of the reflectors 12 or directly upon one of the microphones 14. Each microphone 14 is connected with an amplifier for the purpose of actuating a switch or switches, as described herein, and the amplifiers of each pair of microphones, as 14R and 14L, are balanced against each other to control the selection of the switch to be closed to cause the plane to turn to right or left, to climb or to descend.

The reflectors 12 may be made in one piece or separately. In the latter case, as shown in Fig. 2, the separate reflectors may be joined by means of the rubber strips 13.

Figs. 7 and 8 show the amplifying and relay apparatus which is connected with the microphones to close switches and energize the motor 54 of Fig. 8. The motor 54 turns in one direction for the purpose of moving the rudder to the right and in the other direction for the purpose of making a left turn. Another motor is similarly energized to turn one way for the purpose of lifting the elevator to go into a climb, and in the opposite direction for the purpose of lowering the elevator to go into a dive. The relays of the right hand and the left hand microphones are paired so that the one receiving the stronger signal controls the direction of rudder movement. Likewise the microphones 14U and 14D are paired to determine in which direction the other motor is rotated and consequently which way the elevator is moved. The result of these movements is to turn the plane so that it is pointed in the direction from which sound is received.

Referring to Fig. 3, which is an enlarged section of one of the microphones 14 of Fig. 2, we see it embedded in the sound-absorbing material of base 24, in which there is a cavity 122 to shield the microphone from stray waves. The microphone has a resilient diaphragm 123, which is tuned to frequency $f_1$ (or $f_2$) of Figs. 4, 5 and 6. The diaphragm 123 is supported by a massive ring 124, into which its edge is embedded or clamped.

Frequency of diaphragm 123 is determined by the mass of the inner microphone assembly and the resilience of the diaphragm. Mass of ring 124 affects the frequency somewhat but only slightly if ring 124 is quite heavy. Damping of this tuned system is caused by motion of ring 124 in the material of 24. If the ring is heavy, its movement is slight and the damping effect is small. A suitable amount of damping is obtained by properly proportioning the mass of 124.

The permanent magnet 125 of the microphone is seen in section. Between its poles is the annular air gap 126 surrounding the solenoid coil assembly 127 which comprises windings on a spool of plastic or other non-magnetic insulating material, free to move axially in the air gap. The magnet is similar to a type commonly used in loud speakers. Coil leads 128 go to the amplifier seen in Fig. 7.

Parallel leaf springs 129 allow axial motion of coil assembly 128 in the air gap and provide an additional frequency of response. The mass of spool and coil assembly 127 and resilience of springs 129 are adjusted to provide $f_2$ (or $f_1$) resonance of Figs. 4, 5 and 6. Coil assembly 127 is much lighter than magnet 125 so that the latter's mass has little effect on this resonance. The coil is electromagnetically damped by resistor 131 of Fig. 7.

Figs. 4, 5 and 6 show response curves plotted with the amplitude or volume of response measured vertically and with frequencies measured horizontally on a logarithmic scale with frequency increasing toward the right.

Fig. 4 shows a typical response of a double-tuned microphone such as that of Fig. 3. The two peaks are due to the tuning of the two resonant systems. The curve may be varied by changing the spacing between $f_1$ and $f_2$ or by varying the damping of the resonant system. A more highly damped system would have a less-peaked curve. Reducing the damping would make the peaks higher and sharper with more of a valley between them.

Fig. 5 shows individual frequency characteristics of various components of Fig. 7. The Wien bridge 133 drops to zero output at the frequency $f_3$ to which it is adjusted. The other two curves show the effects of the interstage couplings used in the amplifiers of Fig. 7.

The overall frequency response curve seen in Fig. 6 is obtained for the entire system by multiplying together the transmission factors of each of the curves at the various values of frequency.

Two amplifiers are shown in Fig. 7. They are adjusted to give as nearly as possible the same gain and frequency response when connected to the two microphones 14R and 14L, which are also as similar as possible.

Damping resistors 131 are shunted across the microphones. The smaller the resistance the greater the damping.

Microphone transformers 132 step up the voltage and match microphone impedance to that of input circuits.

Wien bridges 133 cut out frequency $f_3$ (Fig. 5). Their effect is to improve the sharpness of low frequency cutoff. In addition they may be adjusted to kill any specially strong interfering noise from the plane carrying this apparatus if it is of definite frequency.

High-gain tubes 134 and 135 (preferably pentodes such as 6SK7) are of variable-gain type so that automatic volume control (AVC) may be used.

Inductance-capacitance coupling 136, 137, 138 may be used between stages to get good low-frequency cutoff as indicated in Fig. 5. If less low-frequency cutoff is required, chokes 136 and 138 may be replaced by resistors. If sharper cutoff is required, a better high pass filter may be provided by adding more L sections identical to 137—138 between 137—138 and grid 139.

A conventional resistance coupling 140—141—142 may be used to the diode plate 153 of tube 143.

Amplified signal is applied to the diode plate of tube 143 where it is rectified. This puts a negative potential at point 144. This potential is applied through a network of resistors and condensers to grid 146 and point 145. The condensers cut out the sound-frequency variations, leaving pure D. C. potentials. The potential applied to grid 146 of tube 143 reduces its plate current or, in other words, increases its D. C. resistance. The potential applied to point 145 is likewise applied to the grids of the first two tubes in both amplifiers. Thus when either amplifier receives a strong signal, both amplifiers are reduced in sensitivity by the application of AVC bias.

The amplifier output terminals 147 lead to the coil 156 of Fig. 8. Note that the tubes 143 and resistors 148 form a direct-current bridge. Plate supply battery 149 is conneced across the bridge input and terminals 147 are across the bridge output. If tubes 143 are drawing the same plate current the bridge is balanced and no voltage appears across terminals 147. If either output tube 143 receives a signal its plate current is reduced and the resultant unbalance causes a potential to occur at terminals 147. The direction of this potential depends on which side receives the stronger signal. In other words the output across terminals 147 depends on the unbalance of the tubes 143. The bridge circuit balances the response of one microphone against that of the other so that the output represents the excess of energy in one side of the system with respect to the other.

The AVC is an important feature because it makes the device sensitive to the ratio of the signals at the two microphones regardless of their intensities. Without AVC both amplifiers would become overloaded at a relatively low value of intensity and further increase of volume at either microphone would not produce any appreciable unbalance of the output circuit.

Resistor 152 should be large compared to resistors 150 and 151, so that most of the negative control voltage produced at point 144 will be fed into the AVC circuit and to the control grids of the first tubes.

Resistors 151 should be large compared to resistors 150 and 142, so that when one of the amplifiers receives a strong signal little of its negative control voltage will be applied to the grid 146 of the other amplifier. This is necessary so that a signal on one microphone will unbalance the bridge output circuit instead of merely affecting both output tubes similarly.

Note that the AVC circuit is arranged so that a signal received on either amplifier affects the sensitivity of both amplifiers. Both amplifiers are always adjusted to the same sensitivity.

Fig. 8 shows a control arrangement for operating a shunt type D. C. motor 54 in one direction or the other to actuate one of the airplane controls, such as the rudder or the elevator. Two relays are shown. The one on the left is a sensitive relay which actuates the one on the right. The latter is a heavy duty relay which handles the motor currents. If a small motor and a relatively powerful amplifier are used, one relay may be eliminated. The two relays are connected in the same fashion and are identical except in size and rating. They are of the polar type. The pole pieces marked N and S are connected to opposite ends of permanent magnets. Between the pole pieces of each relay is an armature 155 of magnetic material which is pivoted at its center. Around each armature is wound an energizing coil 156. The direction in which the armature is magnetized and hence the direction in which it rotates, depends on the direction of the current in the energizing coil. Each armature carries two contact blades 157 which are insulated from it.

Contacts are provided on each relay to provide two speeds in each direction as well as a neutral position. All of the contacts are open when the armatures are in their neutral positions. If a small current is received from the amplifier output terminals 147, the first relay rotates in one direction until one contact is made at each end of its armature. These contacts are of the spring type to resist, but allow further armature movement. Unless the current is strong, the armature stops in this position, which completes a circuit from battery 158 through coil 156 of the second relay, through the contacts, and through one of the resistors 159. If a stronger signal is received the relay armature is moved with sufficient force to carry it on to close an additional contact which eliminates the resistor 159 from the circuit and provides a heavier current in the coil of the second relay. In the same way, the second relay provides a light or heavy current to the motor 54, depending on the current strength in its coil and hence on the current in the coil of the first relay.

The positions of these relays in the chaser plane may be arranged either to minimize or to utilize the inertia effects acting to swing the armatures 155 on their pivots as the result of a turn made by the plane. For instance, Fig. 8 may be taken as a top view of the relays which control the motor 54 for actuation of the elevator, putting the axes upon which the armatures swing into the plane of the movement caused by the elevator. It will be seen that such movement of the plane will not produce any inertia effect tending to turn the armatures 155 on their pivots. On the other hand, we may consider Fig. 8 to represent a top view of the relays which control the motor 54 for actuation of the rudder. Since the rudder acts to cause the plane to move about a vertical axis and the armatures 155 are arranged to swing upon vertical axes, it will be seen that a sudden response of the plane to the rudder will produce an inertia effect tending to move the armatures 155.

This inertia effect tending to move the armatures may be in the direction of a more forcible closing of a switch which caused the plane to change its course or may be in the opposite direction, tending to reopen the switch which caused the rudder or elevator movement, depending upon how the wires are connected. The latter is the preferred arrangement, as this will prevent the plane from continuing in a turn when it should straighten out to follow the sound source. By proper arrangement of the relays in the airplane it is possible to control the inertia effects upon each of the armatures 155 in the desired manner, to increase the closing effect, to counteract the closing effect, or to balance the inertia effect so that it does not act in either the closing or the opening direction.

In addition to the vibration deadening, insulating, reflecting, air flow and selective amplification means already described for eliminating or reducing the effects of waves produced by the chaser airplane itself, I propose to make use of Doppler effect or relativity of movements for separating the received signals from the frequencies produced by the chaser. This broad principle is disclosed in my U. S. Patent No. 2,066,156 issued December 29, 1936, and in my copending application Serial No. 753,974 filed June 11, 1947, for Aircraft control. In further explanation of how the Doppler effect changes the frequencies of sound waves received by the microphones of the chaser plane from an enemy plane, I give below a formula for calculating these changes in frequency.

The formula for calculating the change of frequency of sound due to Doppler effect is:

Frequency of sound produced by approaching enemy plane $\times$ $$\frac{742.5+\text{chaser M. P. H.}}{742.5-\text{enemy M. P. H.}} = \text{frequency of sound received by chaser}$$

If enemy is departing, change the minus sign to a plus sign. The quantity 742.5 is the velocity of sound in air in M. P. H.

This formula gives the results for direct flight of enemy and chaser on a straight line. For other conditions, such as those illustrated by Fig. 9, the M. P. H. (miles per hour) figures are corrected to the resultant air speeds of the planes taken on a straight line from the position of the enemy at the instant the sound was produced to the position of the chaser at the instant of reception.

The resultant air speed of the chaser is found by multiplying its forward air speed by the cosine of the angle between its path and the straight line above described.

The resultant speed of the enemy when crossing the straight-line sound path is the enemy's air speed multiplied by the co-sine of the acute angle between its path and the straight-line sound path. This is either approach, calling for the minus sign, or departure, calling for the + sign below the line in the formula, depending upon the direction of enemy flight.

It will be seen from the formula and the explanation that the maximum change of received frequency is obtained when the chaser and the enemy are flying directly toward each other on a straight line, a somewhat lesser increase of frequency is obtained when the enemy is flying crosswise of the chaser's path ahead of it, and still less increase of frequency results when the chaser is following the enemy.

This variation of Doppler effects produces the most readily detected signal, i. e. the one having the most distinctive frequency, when the chaser is sent up to head off an approaching enemy. The tendency will be for the chaser plane to turn in the direction of an approaching enemy rather than to follow the departing enemy plane, but when there is no enemy approaching the chaser will follow the departing enemy plane that is closest to it or most directly in front of it.

While there are advantages in making the chaser respond to heat or to some other high velocity emanation instead of to sound, there is a compensating advantage in using the lower velocity sound emanations in that their lower velocity causes the Doppler effect to be more pronounced and this makes it easier to obtain selective reception through use of the Doppler effect principle.

In Fig. 1 it is possible to substitute thermocouples, thermo-cells or other heat responsive devices for the microphones 14U, 14D, etc. The balance of the assembly may remain unchanged except for correcting the amplifying apparatus to match the new sensitive elements.

It is permissible to use a glass in place of the screen 30 when the signal to be picked up is heat or light. The sensitive elements 14U, 14D, etc., may be thermocouples or "thermistors" for the response to heat, selenium cells or photocells for response to light, aerials to pick up radial frequencies or any means responsive to the type of emanation selected for use. All of the relay and switch connections will be substantially the same for these various types of sensitive elements, but the response of the detector stage of the amplifiers must be changed to suit the signal. For instance in the case of employing aerials to pick up radio frequency signals, the first stage of the amplifiers must be responsive to radio frequency instead of to audio frequency.

When heat, light or other wave emanations subject to refraction are employed, the reflectors 12 may be replaced by lenses of glass, quartz or other suitable material. as seen in Fig. 10. Should the emanations selected for operation of the controls by of a suitable nature they can be focused upon properly selected sensitive elements by means of electronic lenses, such as the one shown in Fig. 11.

The effect of time lag in sound transmission on the response of controls to sound is illustrated by Fig. 9. In brief, this effect is that a microphone will respond to sounds coming from a source that is farther to one side of the path than is indicated by the microphone angles of reception, if that source is moving across the cone of reception of the microphone. This effect is less if the emanation selected is heat, light or any form of wave having a higher velocity than sound. It results in a tendency for the chaser to follow an enemy trying to escape and in a greater probability of striking the enemy plane on its tail surfaces than on its nose or one side.

Fig. 9 illustrates a condition under which the enemy plane seen at c is flying along the straight line a—b at 400 M. P. H. A sound wave which it emitted at point a ten seconds ago has just met the chaser plane at point f while it is flying on the path d—e at 500 M. P. H. Meanwhile the enemy plane has moved 1.12 miles to point c.

This sound has travelled on the line a—f, but its effective angle of approach to the chaser plane is on the line g—f because the chaser is moving at ⅔ of the velocity of sound, the distance f—e being ⅔ of the distance f—h and the figure fegh being a parallelogram. The angle of sound entry to the chamber 26 (Fig. 1) is therefore efg and the effect is to cause the chaser to turn to follow the path fg, thus the chaser responds to the presence of an enemy whose sound originated at the angle efh even though this may be greater than the maximum angle that strikes the reflectors 12 of Fig. 1 and the enemy is now at a much wider angle from the chaser's path.

As the chaser's path is changed to point it more nearly in the direction of the enemy, these angles are all reduced and the controls act to cause the chaser to turn constantly in the direction of more exact approach to the momentary position of the enemy, following a path as indicated by the solid line until it runs into the enemy's tail. No sudden swerving of the enemy from its path a—b will escape the chaser because the trail of sound will be followed by the chaser as it turns closer and closer to the straight-line path leading to the enemy and constantly reduces the intervening distance. After close approach the chaser will be guided by the air noise of the enemy plane, even if the enemy shuts off his power and dives in an attempt to escape.

The calculation of Doppler effects on enemy sound received by the chaser will show that for any relative directions of flight of the enemy and the chaser, so long as enemy sound enters the opening 28 in a direction to strike one of the reflectors 12 or a microphone 14, the condition of increased frequency of received sound will be present. The ratio of increase falls to its minimum when the chaser has turned and is following directly behind the enemy on a straight path, but it is still present and the automatic control will respond to any change of path.

The instantaneous frequency of sound received by the chaser's control apparatus seen at $f$ is calculated thus by the formula already given:

Enemy sound frequency $\times$ $$\frac{742.5+500 \text{ cosine } efh}{742.5+400 \text{ cosine } cag} = \text{received frequency}$$

Another chaser flying the path $i$—$j$ is assumed to have just come within range of the sound of the enemy which is now at $c$. It picks up sound which originated at the point $k$, the distance $k$—$i$ being 742.5/400 times the resistance $k$—$c$. While the line $k$—$i$ falls outside of the angle of reception of the chaser at $i$, flying on the path $i$—$j$, the resultant angle of reception $mij$ may fall within this angle, in which case the chaser at $i$ will turn toward the line $i$—$m$. If the chaser at $i$ is far enough ahead of the enemy at $c$ this will result in a head-on collision, but if not, the chaser shown at $i$ will execute an S turn, first to the left and then to the right, to crash into the enemy's tail in the same manner as the chaser shown at $f$, provided that the chaser now at $f$ does not reach the enemy first.

There is a remote possibility of the two chasers colliding, but in consideration of this it should be remembered that any sound of the chaser at $f$ now reaching the chaser at $i$ must have started at a point ⅔ as far to the rear on the path of the chaser at $f$ as that rearward point in the air now is from the present position $i$. This would place the point of sound origin so far to the left and rear as to be actually behind the chaser at $i$, both outside of its angle of reception and too far from it for the sound to be effective. The result is that it is very hard for a chaser to follow and collide with another plane that flies at nearly its own speed, but it has a great advantage in picking up the sound of and following any slower plane. It will also be observed that head-on collisions with enemy planes will be rare if the enemy planes are very fast. The usual result will be for the chaser to collide head-on with large slow planes of which advance warning has been received, but to turn and follow a fast plane. Whenever the plane followed is slower than the chaser, there will be a rear-end collision which destroys both planes.

Fig. 9 greatly exaggerates the sizes of the planes in proportion to their distances apart, yet the chaser at $f$ is only ten seconds from the point $a$ and a fraction of a minute from the point at which it will overtake the enemy plane now seen at point $c$. This allows very little time for the accidental appearance of a second chaser in the path of a first one.

Taking the condition of two chasers launched one after another in the same direction, we find that the forward one goes at a higher speed than the later one for a time, hence there is no signal received by the second chaser during this acceleration period. When they both reach their top speed, assuming them each to fly at 500 M. P. H., the Doppler effect will be exactly canceled as it is received by the second one. The formula applies thus:

Leading chaser frequency $\times$ $$\frac{742.5+500}{742.5+500} = \text{original frequency}$$

The condition of two chasers flying on parallel paths results in cancellation of the Doppler effect on the sound of each as received by the other, hence they will not be guided into each other. We have analyzed the condition of chasers flying on converging paths and seen that they are not steered into collision. The condition of diverging paths will put the point of sound origin still further behind each of the chasers.

Another fact to bear in mind is that even with the most rapid launching of chasers they will be several seconds apart and in one second a chaser will travel about 700 feet with the present state of the art.

It is reasonable to assume that the chasers will fly at 1100 feet or more per second before this patent expires, and with such speeds the problem of shielding the microphones against the noise of the chaser itself will be eliminated due to the fact that such sound cannot travel forward through air to the point at which the microphones are located.

Fig. 10 shows a modification of Fig. 1, for use in connection with radiations which are susceptible to refraction with suitable lenses. Whereas, the assembly 10 of Fig. 1 is provided with a screened or unobstructed opening particularly adapted for the reception of sound, the assembly seen in Fig. 10 is provided with solid lenses 34 of glass, quartz, plastic or other suitable material which offers a minimum resistance to the passage of the wave lengths to be received. Instead of using reflecting surfaces as shown in Fig. 1, the rays are focused by means of lenses which correspond to the reflectors 12 of Fig. 1. These lenses may also serve as windows, they may be located inside of the housing or they may be compound lenses and thus located both ways.

The sensitive elements 15D and 15U of Fig. 10 are thermocouples, thermistors, selenium cells or suitable devices responsive to the type of emanation selected for use. Certain forms of radiant energy, particularly in the range of heat and light, may be focused either by means of reflecting surfaces, as in Fig. 1, or by means of lenses as shown in Fig. 10. In the event that reflecting surfaces are used for such radiations, it will be understood that a window may replace the screen 30 in Fig. 1.

For most of the radiations which are likely to be employed, the insulating material 23 of Fig. 10 may be the same as that used in forming the parts 20, 21 and 24 of Fig. 1. The shell 22' of Fig. 10 may extend all the way back to the wing or fuselage of the chaser or other plane carrying the apparatus and form the support for the assembly, whereas in Fig. 1 it is preferred to stop the shell 22 some distance from the metal structure of the airplane.

Fig. 11 is a somewhat diagrammatic representation of the device known as an electronic lens. It is to be understood that this type of lens may be substituted for glass lenses when the received emanations are such as to be subject to focusing by an electronic lens.

In connection with sound I have discussed means for making use of Doppler effect. This same effect is present in the case of heat, light and other emanations having much higher velocities than sound, but the percentage change of the wave length received is much less on account of the much greater velocity of the signal, the Doppler effect being dependent upon relative speeds of aircraft to the speed at which the wave emanation travels. This difference is discussed in my U. S. Patent No. 2,066,156 issued December 29, 1936. In this patent I disclosed a heterodyne method for obtaining a beat note due to Doppler effect on radio waves. This same principle is applicable in the present case with the exception that it is not necessary to distinguish between a signal picked up from an approaching plane and one picked up from a departing plane, there being no need for indicating the rate of relative approach or departure. As a matter of fact, it will always be approach, even when the enemy plane is departing, since the plan is to make these chaser planes fly faster than any man-carrying plane.

The signal received, either direct or by the beat note method, will have a much higher frequency when the enemy plane is approaching than when it is being followed by the chaser plane, hence there will be an effect tending to cause the chaser plane to turn in the direction of an approaching enemy plane rather than in the direction of a departing enemy plane. This is desirable because it increases the probability of bringing down the enemy plane before it has reached its objective.

Fig. 12 shows how the motor 54 may be connected with the rudder or the elevator, as the case may be, to move it in one direction or the other and to neutralize it when no power is applied to the motor. The rods or cables 56 and 57 may be considered as leading to the elevator or to the rudder, consequently the movement of rocker 59 upon its fixed pivot 60 will actuate such a control surface. The rocker 59 is in turn actuated through the medium of the connecting rod 62 by the rod 64 which is connected with the rack 66. The motor 54 carries the pinion 68 which meshes with the rack 66.

When the motor 54 is rotated clockwise the rack 66 is moved toward the left, carrying the rod 64 and the collar 70 attached to it. This collar pushes against the spring retainer 72, compressing the coil spring 74, while actuating the rocker 59 through the medium of the connecting rod 62. When current is no longer supplied to the motor 54, due to opening of the relay switch which energizes it, the spring 74 acts to return the rocker 59, thus neutralizing the control surface associated with it. Likewise, when the motor 54 is rotated counter-clockwise, the rod 64 is placed under tension and the left-hand spring retainer 72 is moved to the right by the stop 70 attached to the rod. Again the spring returns the rod 64 to its neutral position as soon as the motor current is cut off.

By suitable adjustments this neutral position to which the rod 64 returns whenever motor current is cut off may be for straight forward flight of the chaser plane or for flight in a circular path. Adjustments such as this may readily be made by means of threaded fittings such as turnbuckles or the threaded end piece 76 on the rod 64.

Fig. 13 illustrates a grappling device which may be used to cause greater damage to the enemy plane. While the proposed weight and speed of the chaser should be ample for destroying any type of military airplane now in use, it is conceivable that the size of such planes may increase greatly and that the impact of collision may under some conditions be insufficient to bring down the enemy. I have, therefore, provided this device to attach the chaser plane to te enemy plane upon impact.

The shell 80 may be considered as the nose of a propeller, as the nose of the fuselage or as the leading edge of a wing. Within this streamlined shell, which is preferably formed of rather thin metal that is readily crushed or cut, the two grappling hooks 82 and 84 are pivoted so as to be in position to pierce the shell 80 by their own inertia in case of a collision. These hooks are attached to separate shafts 83 and 85, each of which also carries a ratchet quadrant 87, the ratchet quadrant being fixed relative to the hook. The two shafts have their bearings in the support 89 which is attached to the forward end of the rod 90. Upon impact with an enemy, the shell 80 is crushed back against the support 89 and the inertia of the hooks 82 and 84 causes them to pierce and tear the metal of the shell 80, swinging forward to the positions indicated as 82' and 84'. When the hooks are in these positions, the ratchet quadrants will each have been rotated so that their teeth engage the spring member 91 on its opposite ends, thereby preventing the hooks from returning. The supporting shaft or rod 90 is preferably anchored to the engine or plane securely enough to carry the weight and air resistance of the entire chaser. The object is to have the hooks swing forward to their grappling position when the chaser strikes a fairly solid part of the frame structure of the enemy so that the hooks will not readily tear out of whatever it is that they grab.

Fig. 14 is a plan view of the chaser plane with the left wing and part of the tail surface broken off. The nose structure, including the base 24 and the shell 22, may be similar to Fig. 1. The fuselage is largely formed by the wings themselves, as will be later explained, but it may be made separately and the wings attached to it. In either case, I speak of it as the fuselage or body and it encloses the power plant. The forward end of the fuselage may be open, as at 32, for air intake to cool the engine, or the air gap between the nose structure and the fuselage may be eliminated if other means is provided for cooling the engine. In any event, it is preferred that the shell 22 be supported by nonmetallic vibration-absorbing means, such as rubber blocks 33 or the sponge rubber base 24, so that the structural vibrations and engine noises will not be so readily transmitted to the metal shell 22.

The shape of the opening 32 is preferably of Venturi cross section so as to increase the air velocity through the throat of the opening. By increasing the air velocity at this point to something in excess of 1088 feet per second, it is possible to stop the transmission of sound outwardly (forwardly) in the air flowing through the opening.

A similar effect can be obtained around the shell 22. The low pressure area back of the leading edge of an aerofoil or on the upper surface of a wing is comparable to the low pressure zone in the throat of a Venturi passage. The air travels at higher velocity and exerts a reduced pressure in both cases. This principle is utilized to provide a band of high velocity, low pressure air around the nose of the assembly 10 or outside of the shell 22 seen in Fig. 14. Sound approaching the opening 28 in the nose of 22 at an angle from the rear, as indicated by the dotted arrow $q$, will encounter this high velocity zone of air and be thereby stopped from reaching the opening 28 in the nose of 22.

Another effect which assists in the stopping of sound travel through air to the opening 28 from the rear is capable of calculation by triangulation as follows: The sound which is produced at the forward point of the propeller nose would travel on the line of the dotted arrow $p$ (Fig. 14) if it were not for the forward movement of the plane in air. Actually the sound produced by air at the forward tip of the propeller hub must travel forward at an angle of about 45° in order to reach a point on shell 22 near the opening 28, hence it reaches this zone travelling in a direction such as that of the dotted arrow $q$. This brings the sound into the zone of the high velocity air which stops its forward travel. Should the air velocity over the shell 22 not be high enough to prevent upstream travel of sound at the zone where the sound waves approach the shell 22 from the rear, any such sound will be reflected forward into space instead of entering the opening 28.

The sound so reflected forward may strike another airplane and be reflected back so that it enters the opening 28, but in that event, it is proper that the reflected sound should reach one of the microphones. This will cause the chaser to turn in the direction of the plane from which the sound was reflected, if it is near enough, even though the engine of that plane has been shut off in an attempt to dodge the chaser plane.

When the receiving apparatus is located in the nose of the chaser, as seen in Fig. 14, it is preferred that propellers be located one on each side and synchronously driven by chain or gear means from a centrally located engine. This places the propellers in front of the plane where they will assist in destruction of an enemy plane upon collision therewith. In addition to this provision for employing the propellers as means for destruction of the enemy, I have shown in Fig. 14 the blades 38 mounted in the nose of the propeller hub. These blades or barbs are set at a helix angle to correspond approximately with the usual lead of the propellers and are pivoted so that they may be depressed against spring means, not shown, to the position indicated by the dotted lines at 38'. The propeller nose is preferably supported by a solid shaft so that it is rigid enough to penetrate the structure of an enemy plane. The barbs or blades form a spear head which assists in such damage and may under favorable conditions anchor the chaser plane to the enemy plane.

I have also shown in Fig. 14 a recommended method for starting the engine of the chaser. Since the chaser plane is to make but one flight, it will not pay to equip it with a starter. It can be started by hand, but quicker starting will be obtained by means of power and I, therefore, propose that the shaft 40 be power-driven by means which will allow its removal from the path that the chaser will take when released. This shaft, when driven in the direction indicated by the arrow, causes the clutch member 41 to slide toward the chaser propeller and engage the blades 38 by means of internal teeth in the part 41. This forward movement is due to inertia and the spiral slot 42 which engages the pin 43 fitted into the shaft 40. When the engine of the chaser starts, the propeller rotates at a higher speed than the shaft 40 and this causes the movable member 41 to be withdrawn from engagement with the propeller hub in the same manner as starting motor pinions are withdrawn from ring gears on automobile engines. A weight 44 may be added to the clutch 41 if required to obtain proper action.

Fig. 15 is a sectional view of Fig. 14 and illustrates the preferred wing and fuselage construction. The upper surface of the two wings and the upper central portion of the fuselage are preferably formed by one stamped sheet of metal 47. Likewise, the lower surfaces of the two wings and the lower central portion of the fuselage are formed in one stamping 48. These two stampings are welded together at their peripheries, thus forming the main part of the airplane from the two pieces of metal which now become one piece. This construction would be modified in building airplanes for general use by providing openings for assembly and dis-assembly of parts located within the wings, but in the case of these chaser planes, it is not considered necessary to have accessibility for service, since they are to be used only once.

Each of the two propellers has a torque reaction tending to rotate the plane in a direction opposite to the propeller rotation. One reason for the use of two propellers on the chaser plane is that this torque reaction would interfere with control of the plane if not balanced. By using two propellers driven in opposite directions the torque reaction is balanced in-so-far as it tends to tilt the airplane about its fore-and-aft axis. The torque reaction does, however, impose some load on the structure of the plane. I proposed to drive the propellers in such directions that this torque reaction is employed to counteract a part of the lift stress on the wings, instead of adding to such stress. By employing a propeller of right hand, or so called normal pitch, on the left wing, it will be seen that the two propeller shafts rotate toward each other as viewed from above. Referring to Fig. 15, it is seen that this application of power to the propellers tends to make each wing rotate about the axis of the propeller in the opposite direction, throwing a tensile strain on the top skin of the wing and a compression strain on the lower skin of the wing. Since these stresses are in the reverse of direction of normal lift, they tend to reduce rather than increase the maximum stress for which the wing must be designed.

One method of driving the two propellers in opposite directions is illustrated in Fig. 15, where the central bevel gear 93 is assumed to be attached to the crank shaft and the outer bevel gear 94 is assumed to be attached to the crank case of a bi-rotary engine such as is disclosed in my copending patent application Serial No. 387,709, filed April 9, 1941, now Patent No. 2,419,787, dated April 29, 1947. Another way of obtaining the same directions of propeller rotation with the bi-rotary engine is illustrated in the fractional view in Fig. 16. Looking down at the top of the bi-rotary engine we see that the revolving crank case 95 carries a sprocket wheel on which runs the chain 96, leading to the left hand propeller. A similar sprocket wheel is mounted on the crank shaft 97 and carries the chain 98 which drives the right hand propeller on the left wing.

At the section of the fuselage seen in Fig. 15, the engine housing is formed in part by the upper stamping 47, in part by the lower stamping 48 and in part by the internal stampings 50 and 51 which are shown between the upper and lower members of the wing structure and are preferably welded to these wing members.

When using an engine of which only the crank shaft revolves, the drive of Fig. 15 may be modified by the use of a spiral or worm gear set as seen in Fig. 17. The driving gear 101 is mounted on the crank shaft 97 and drives the gear 102 above it, which has its axis located in a straight line between the two propeller shafts. The shaft 103 replaces the two angularly disposed shafts of Fig. 15. This shaft may still be in two sections so that flexure of the wing will not throw undue strains on the bearings, but the two propellers be synchronized to maintain substantially equal angles relative to a vertical plane through the axis of the receiving device.

Fig. 18 illustrates the use of skew-bevel gears for the same purpose of the gears seen in Fig. 17. In these several views of alternative propeller drives I have omitted the showing of bearings for the sake of simplicity, since the main object of these views is to illustrate the directions of rotation and relative positions of shafts. There will be suitable bearings provided with support from the wing members, the fuselage structure or the engine.

In the design of the chaser plane it is suggested that the center of gravity be somewhat farther to the rear than normal in airplane design, particularly with an empty tank. This can be balanced by placing the fuel tank in the nose, ahead of the engine, possibly with small tanks in the leading edges of the wings. It is not necessary to consider the dead stick gliding angle as the chaser planes are not required to maintain a flying attitude with a dead engine. It is preferred that when the chaser falls after exhausting its fuel supply, it will fall tail first or in a spin which considerably retards the vertical velocity of the fall. The object of this is to cause the least damage on the ground in the event that it falls in friendly territory. On the other hand, there is an advantage in so designing the plane that it will fall with sufficient velocity to destroy it in the event of it falling in enemy territory. The designer will naturally consider the pro and con of this in view of the tactical use preferred by the armed forces.

Aside from the requirement that the chaser plane have lateral stability with sufficient diahedral angle or other provision for making it bank properly on turns, it is not required that the design be particularly stable. The control surface may be larger than normal in proportion to stabilizing surfaces, as it is desired to obtain quick response to the controls.

Fig. 19 illustrates a method of obtaining power for the actuation of controls. The tube 17 is a continuation of the one seen at the center of the microphone assembly of Fig. 1, where it extends through the rubber plug 18. This tube opens into the chamber 26 in which the air pressure is higher than ambient. Such air pressure will vary with speed and with atmospheric density. The tube 17 conducts this air pressure to the interior of the bellows 104 which is located within the sealed chamber 105. This chamber is evacuated or is charged with low pressure of air or other gas so that the pressure does not vary with the surrounding atmospheric pressure. A slight increase of pressure within the bellows 104 will, therefore, compress the smaller bellows 106 which is filled with a liquid 107. This liquid also fills the larger external bellows 108 so that the movable head 109 of the external bellows 108 moves a smaller distance than the head 110 between the two internal bellows, but with increased force due to hydraulic leverage. The variations of pressure within chamber 26 may thus be utilised to control various functions of the plane and its power plant such as throttle opening, propeller pitch, super-charging effect, engine timing or the connecting or disconnecting of the chaser plane control apparatus.

The hydraulic method of providing leverage as shown by Fig. 19 is one of several methods by means of which it is possible to obtain whatever energy may be required to actuate various controls or accessories. Where a greater amount of energy is required, it is permissible to allow some air flow and use gearing connected with a suitable air-driven motor.

Such an air-driven motor may be actuated by air from the chamber 26 or by a greater flow of air at a point outside of this chamber, as for example, the means shown in Fig. 21 for obtaining the power to move the elevator and the rudder.

Fig. 20 illustrates a chaser adapted to carry an explosive charge and designed to be dropped from an airplane instead of being self-propelled. One plan of use is to drop these bombs onto submarines or surface craft from aircraft. They may be guided by sound or by heat reception. The receiving apparatus is located in the nose-section enclosed by the shell 22 as before described. The motors and relays are preferably located within the rear section 117 and the larger middle section is filled with an explosive charge.

The fins or wings 113 are provided as guiding means and to obtain surfaces with which the rudders 115 and 116 will react like they do with the larger wings of an airplane in steering the chasers.

The method of control surface actuation is the same as described in connection with the motor driven chaser, using two motors and a battery or obtaining power for control surface actuation from the movement through air as described in connection with Fig. 21.

The rudders 115 and 116 of Fig. 20 may be pivoted on separate bearings, as are the elevator and rudder of an airplane, or they may be movable as one on a universal joint allowing for both movements.

The section 117, adjacent to the rudders, encloses the motors for actuating them, and optionally may enclose all or part of the relay apparatus while the main section between this and the nose will be filled with explosive.

Fig. 21 illustrates a modification of Fig. 20 in which power for control surface actuation is obtained from the air as the bomb falls, instead of being supplied by an electric battery and the motors 54 previously described.

For this purpose, I have shown the two air-driven wheels 164 and 165, which are of right and left-hand pitch so that they do not cause the bomb itself to be rotated. There are four rudder surfaces of which 166 and 167 act as one and may be assumed to represent the rudder of an airplane while the movable surfaces 168 and 169 are the other pair and correspond to the elevator. Actually both pairs are properly spoken of as rudders in the case of a gravity bomb, the action being equivalent to that of the elevator of an airplane while it is in a vertical dive.

The air-driven wheel 164 is mounted on a shaft free to rotate within a hollow shaft on which the wheel 165 is mounted. This provides two separate power-driven shafts inside of the compartment 117 for use as substitutes for the two electric motors 54. The relay apparatus will engage clutches for actuation of the control surfaces instead of closing switches to energize the electric motors. Otherwise, the control apparatus of Figs. 20 and 21 will be as described in connection with the engine-driven air chasers.

While Figs. 20 and 21 show chasers propelled by gravity, it is understood that they may optionally be propelled by an engine, by a rocket charge or otherwise. In the event of using one of these propelling means, the air wheels 164 and 165 of Fig. 21 may still be used to actuate the control surfaces of 166 to 169, inclusive, or if rocket propulsion is used, these controls may be moved by means of power obtained from the rocket charge.

One way of employing a rocket charge to move the control surfaces would be to by-pass a portion of the expanding gases of combustion of the rocket charge and use such gases to drive a wheel or wheels to supply the required power. This may be done by means of the wheels 164 and 165, assuming the rocket discharge to be so located that a part of it passes through the blades of these wheels.

Figs. 20 and 21 are not limited to gravity propulsion nor to rocket propulsion and it is to be understood that the devices of any figures may be applied to or combined with other figures of the drawings, using engine propulsion, jet propulsion such as rocket means, explosive propulsion such as shooting from a gun, or gravity propulsion as when dropped from an airplane.

Fig. 10 may be taken as the nose of Fig. 20 or 21, using heat as the agency for detection and guidance, or Fig. 1 may be so taken. In consideration of Fig. 10 it will be understood that the gasoline tank 175 may be replaced by an explosive charge, either for propulsion by rocket means or for destruction by explosion. The explosive charge is in section 112 of Fig. 20. This location of the fuel supply fits in with the plan of making the chaser tail-heavy when out of fuel so as to prevent it from falling in a straight nose dive when out of fuel. This principle applies to either gasoline or rocket fuel, but not to gravity propulsion in which it is desired to have the chaser fall nose first.

When the chaser is propelled by gravity and carries an explosive charge it will usually be dropped with an attempt to aim it at a definite objective, hence the steering apparatus is called upon to make small corrections in the path rather than to follow a rapidly moving objective. For this reason, and because there is no heat or noise produced by a chaser of the gravity type, it is possible to simplify the receiving and amplifying apparatus somewhat, using less amplification or less provision for eliminating background interference.

Another consideration is the time of exposure required to obtain response to heat by means of a thermopile. There is more time available for obtaining thermal response to the heat emitted by a battleship at which a bomb type chaser is aimed from the air than there is for obtaining similar response on a chaser plane from an enemy plane crossing its path, and in addition the volume of heat emitted by the stack of a ship is usually greater than the volume of heat emitted by an airplane. It therefore appears that the thermal type of receiving apparatus may be preferred for attack on seacraft and the sound type preferred for following enemy aircraft.

The receiving elements 15D and 15U of Fig. 10 may be thermally responsive devices such as thermopiles connected in opposition as to potential so that current is generated by the one receiving the greater amount of heat to flow in one direction through the D. C. amplifier 180, or by the other to flow in the opposite direction. The amplifier 180 is assumed to have been adjusted to compensate for differences between the thermopiles, and between amplifier tubes etc. by means of the null or balance control 181.

Current from the amplifier flows in one direction or the other, according to the direction from which the signal is received, through the coil of polar relay 183, thereby moving the armature 184 to make contact so that current from battery 186 flows to one or the other of the contacts 187. These may lead to the windings of opposed electromagnets for moving switch contacts corresponding to 157 of Fig. 8 in one direction or the other to energize motor 54 for right or left-hand rotation. The winding of each of the opposed magnets would be connected at its opposite side to the wire 188 leading back to the battery 186.

Means such as a spark gap supplied from an induction coil having a vibrator in its primary circuit connected with battery 186 may be used to ignite the gasoline when tank 175 is damaged by collison and spills its contents. Such an assembly is indicated by the general reference number 189. The primary circuit of this spark coil is provided with a switch to be closed before the chaser is launched.

The detection apparatus disclosed herein may be employed on moving craft to detect stationary objects or at stationary points to detect moving objects, as well as on moving craft to detect other moving craft.

It will be further understood that the apparatus herein disclosed may be used on aircraft under the control of a human pilot and either connected to actuate the controls of the aircraft or connected to an indicating instrument for guidance of the pilot. Such use may be either to locate or to avoid other aircraft or other wave energy sources.

In designing a chaser, it is possible to simplify the problem of selective sound reception by careful attention to the frequencies of reception and of sounds produced by the chaser itself. My plan is to select the zone of maximum response (Fig. 6) to start slightly above the frequency of the stronger or more readily received sounds of prevailing types of aircraft in general use or in use by the enemy in particular. These will be such sounds as are produced by engine exhaust frequencies and by propellers. Above this frequency band there are other sounds of much higher frequencies which do not carry so well, being lower in energy values and of shorter wave lengths, such as those of fuel detonation, the vibrations of shorter, more rigid parts, and certain air noises. The band of maximum sensitivity of the microphones is preferably a little above the first group and below the second group of prevailing sounds of other aircraft. To provide a wider spread between the band of maximum response of the receiving apparatus and the band of maximum sound energy output of the chaser plane, I propose to take certain steps as follows in the design:

The chaser is to be smaller than man-carrying airplanes and hence have shorter structural members and propellers of less diameter than usual. This results in the sounds produced by structural vibrations being of higher than normal frequency and outside of the band of maximum receptivity of the microphones.

The propeller tip speed of the chaser is preferably lower than on man-carrying airplanes and hence the air noises produced by the propeller will be of a lower order of frequency.

The engine will preferably have fewer cylinders than those of other engines used in airplanes designed for war use and hence will produce fewer explosions per second, hence this frequency is well below the band of maximum receptivity of the chaser's detecting apparatus.

What I claim is:

1. In an approach responsive system carried by an aircraft, in combination, a pair of microphones, a housing enclosing both said microphones and having an opening for sound, and means for causing air to flow over said housing around said opening at a velocity greater than the air speed of said aircraft to provide during flight of said aircraft a shield of high velocity air to uniformly protect the microphones of said pair from sounds produced on said aircraft, such protection being provided by the velocity of air flow in proportion to the velocity of sound in air.

2. In a device carried by an aircraft and adapted for detecting reflected wave energy for the purpose of locating objects external to said aircraft, a casing enclosing a pair of sensitive elements responsive to said reflected wave energy when received with a Doppler effect increase of frequency, said casing including walls insulated to shield said sensitive elements from wave energy of the general type to be detected, a port in one of said walls common to said sensitive elements and adapted to allow entry of such wave energy, deflecting means shaped to concentrate such wave energy entering through said port on one of said elements when received from one general direction within predetermined angular limitations at one side of the forwardly projected line of flight of said aircraft and on the other of said elements when received from a general direction within corresponding angular limitations on the opposite side of said forwardly projected line, and means for amplifying the energy which one of said elements receives in excess of that received by the other of said elements.

3. In a approach-responsive system adapted to be carried by an aircraft, in combination, a pair of receivers responsive to waves received from objects being relatively approached by said aircraft, a housing enclosing said receivers, a port in said housing common to said receivers for passage of said waves to the interior of the housing, deflecting means arranged to concentrate said waves entering through said port upon one of said receivers when arriving from ahead of said aircraft within preselected angular limitations with respect to the forward extension of the fore-and-aft center line of said aircraft and to concentrate said waves upon the other of said receivers when arriving from directions within a second set of preselected angular limitations with respect to said forward extension of the center line, the center lines of said sets of angular limitations being at approximately equal angles to said forward extension and on opposite sides thereof, and amplifying means for each of said receivers, the whole including means for producing an increase of output in response to an increase of frequency of the received waves and thereby detecting from within which general direction the higher frequency waves are received.

GLENN MUFFLY.

REFERENCES CITED

The following references are of record in the file of this patent:

UNITED STATES PATENTS

| Number | Name | Date |
|---|---|---|
| Re. 15,550 | Zimmermann | Feb. 27, 1923 |
| 1,018,400 | White | Feb. 20, 1912 |
| 1,137,222 | Leon | Apr. 27, 1915 |
| 1,266,029 | Lehman | May 14, 1918 |
| 1,280,803 | Miners | Oct. 8, 1918 |
| 1,299,616 | Reiber | Apr. 8, 1919 |
| 1,303,105 | Murdock | May 6, 1919 |
| 1,312,510 | Baker | Aug. 12, 1919 |
| 1,421,803 | Martin | July 4, 1922 |
| 1,588,932 | Blair | June 15, 1926 |
| 1,702,306 | Morse | Feb. 19, 1929 |
| 1,735,662 | Trevino | Nov. 12, 1929 |
| 1,853,376 | Powelson et al. | Apr. 12, 1932 |
| 1,855,422 | Roussey | Apr. 26, 1932 |
| 1,901,734 | Cotroumpas | Mar. 14, 1933 |
| 1,922,825 | Squires | Aug. 15, 1933 |
| 1,973,673 | Rice | Sept. 11, 1934 |
| 2,066,156 | Muffy | Dec. 29, 1936 |
| 2,109,475 | Fanning | Mar. 1, 1938 |
| 2,133,241 | Baker | Oct. 11, 1938 |
| 2,166,991 | Guanella | July 25, 1939 |
| 2,169,982 | Von Manteuffel | Aug. 15, 1939 |
| 2,223,708 | Van Nes | Dec. 3, 1940 |
| 2,226,366 | Braden | Dec. 24, 1940 |
| 2,299,327 | Johnson | Oct. 20, 1942 |

FOREIGN PATENTS

| Number | Country | Date |
|---|---|---|
| 23,570 | Great Britain | 1912 |
| 352,035 | Great Britain | June 22, 1931 |

OTHER REFERENCES

"Bloodhound of the Air," appearing in the Sunday morning edition, July 22, 1923, of the newspaper "Public Ledger" of Philadelphia, Pa.